United States Patent [19]
Wolf

[11] Patent Number: 5,103,639
[45] Date of Patent: Apr. 14, 1992

[54] EXHAUST NOZZLE HAVING VARIABLE CONTOUR EXHAUST FLAP

[75] Inventor: Jeremiah P. Wolf, Cincinnati, Ohio

[73] Assignee: General Electric Company, Cincinnati, Ohio

[21] Appl. No.: 484,942

[22] Filed: Feb. 26, 1990

[51] Int. Cl.⁵ .............................................. F02K 1/00
[52] U.S. Cl. ....................................... 60/271; 60/242
[58] Field of Search ...................... 239/265.12, 265.33, 239/265.37; 60/271, 242

[56] References Cited

U.S. PATENT DOCUMENTS

| | | | |
|---|---|---|---|
| 2,880,575 | 4/1959 | Scialla | 239/265.37 |
| 3,558,058 | 1/1971 | Lennard | 239/265.39 |
| 3,612,209 | 10/1971 | Vdoviak et al. | 181/33 HC |
| 4,000,854 | 1/1977 | Konarski et al. | 239/265.35 |
| 4,037,405 | 7/1977 | Huenninger et al. | 60/229 |
| 4,392,615 | 7/1983 | Madden | 239/265.37 |
| 4,420,932 | 12/1983 | Mendez et al. | 60/230 |
| 4,878,617 | 11/1989 | Novotny | 239/265.35 |

FOREIGN PATENT DOCUMENTS

| | | |
|---|---|---|
| 895331 | 5/1962 | United Kingdom . |
| 896484 | 5/1962 | United Kingdom . |
| 918091 | 2/1963 | United Kingdom . |
| 1131840 | 10/1968 | United Kingdom . |
| 1456280 | 11/1976 | United Kingdom . |

OTHER PUBLICATIONS

Aerospace America, May 1987, p. 8.

Primary Examiner—Louis J. Casaregola
Assistant Examiner—Laleh Jalali
Attorney, Agent, or Firm—Jerome C. Squillaro

[57] ABSTRACT

A method is disclosed for discharging combustion gases from an engine powering an aircraft at subsonic and supersonic velocities. The engine includes a variable area exhaust nozzle having primary and secondary flaps defining a generally converging channel and exhaust channel, respectively, for the combustion gases. The method comprises the steps of contouring the secondary flaps to a first contour at a first position at a first value of a nozzle pressure ratio NPR across the converging and exhaust channels. The method further includes the step of contouring the secondary flaps to a second contour at a second position at a second value of NPR. In a preferred embodiment, the first contour is straight at low values of NPR and the second contour is generally concave for high values of NPR. Preferred embodiments of an exhaust nozzle for carrying out the method include the secondary flaps taking the form of a plurality of articulated secondary flap segments which are positionable collectively to form a straight contour at low NPR values and to form a generally concave contour at relatively high NPR values.

23 Claims, 10 Drawing Sheets

Fig. 10.

Fig. 1.
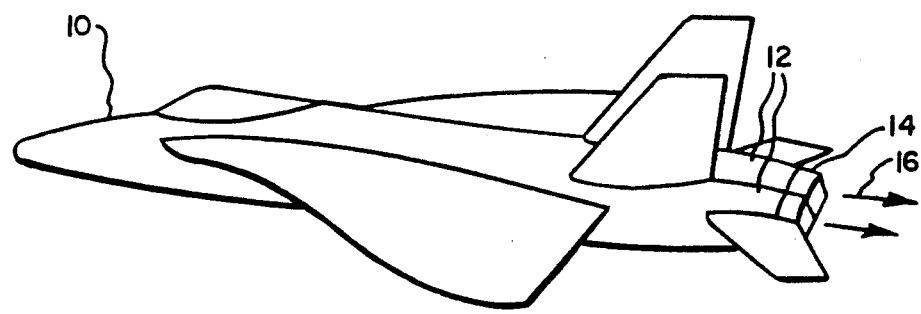
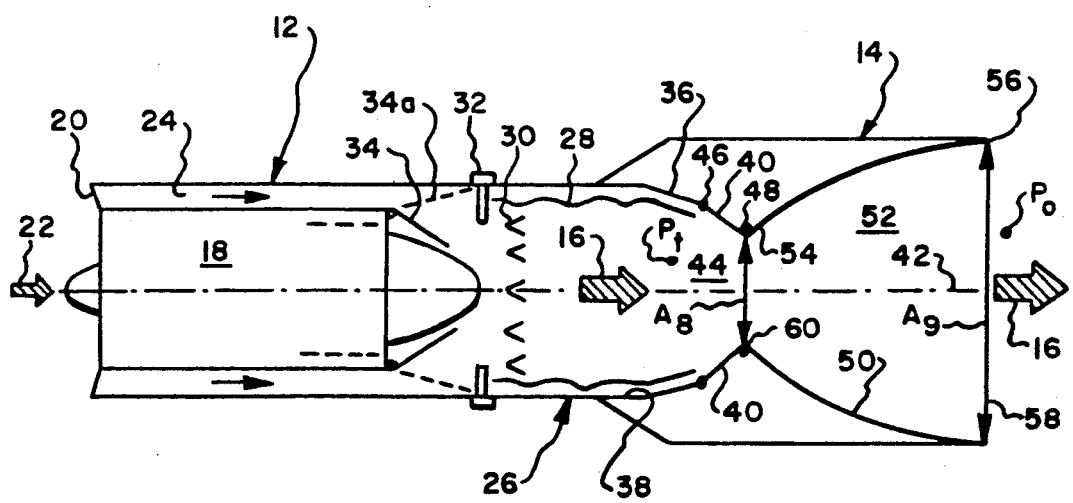
Fig. 2.

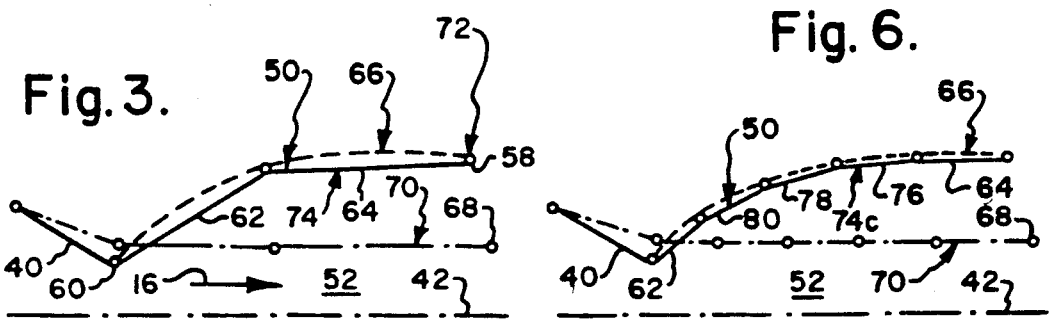
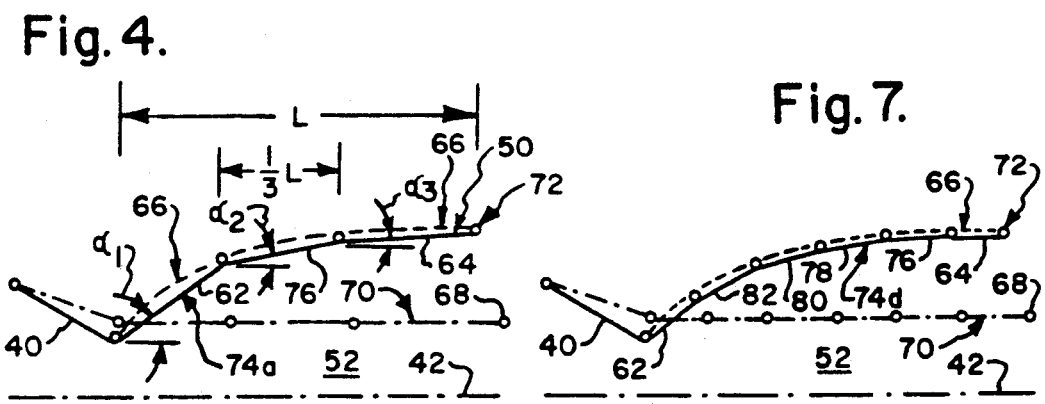
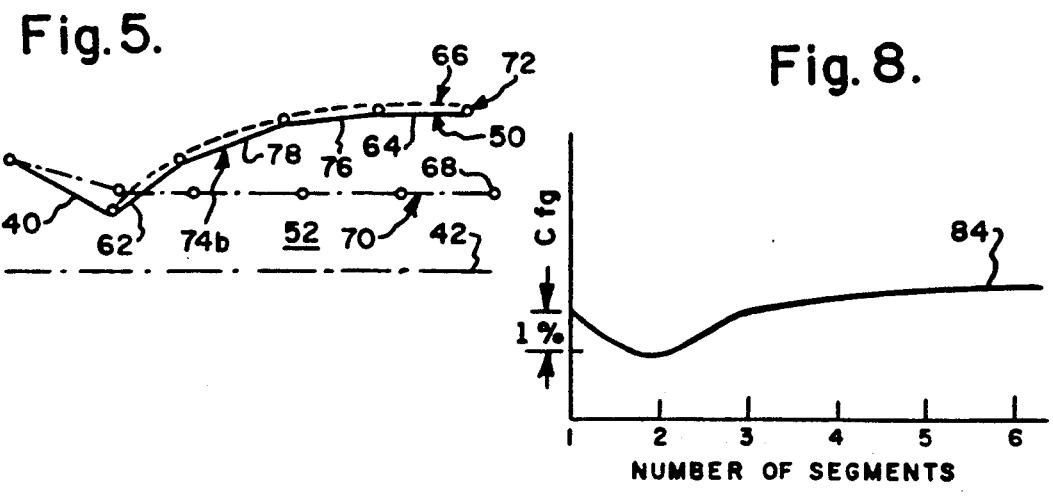

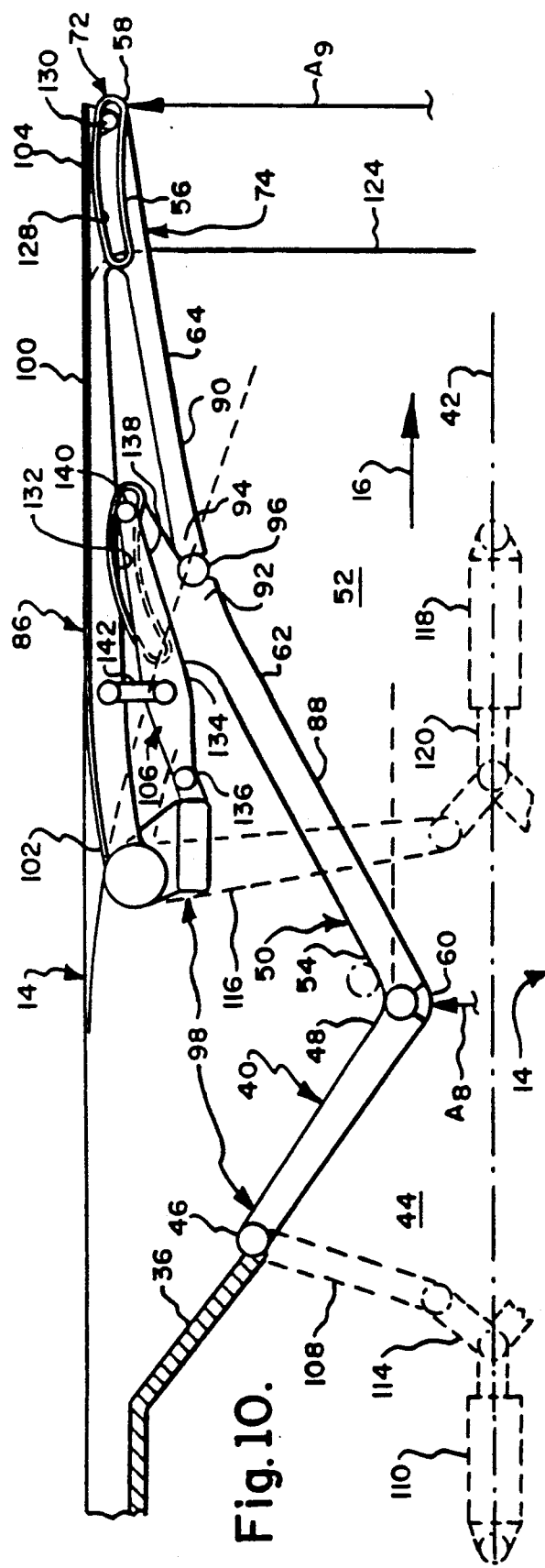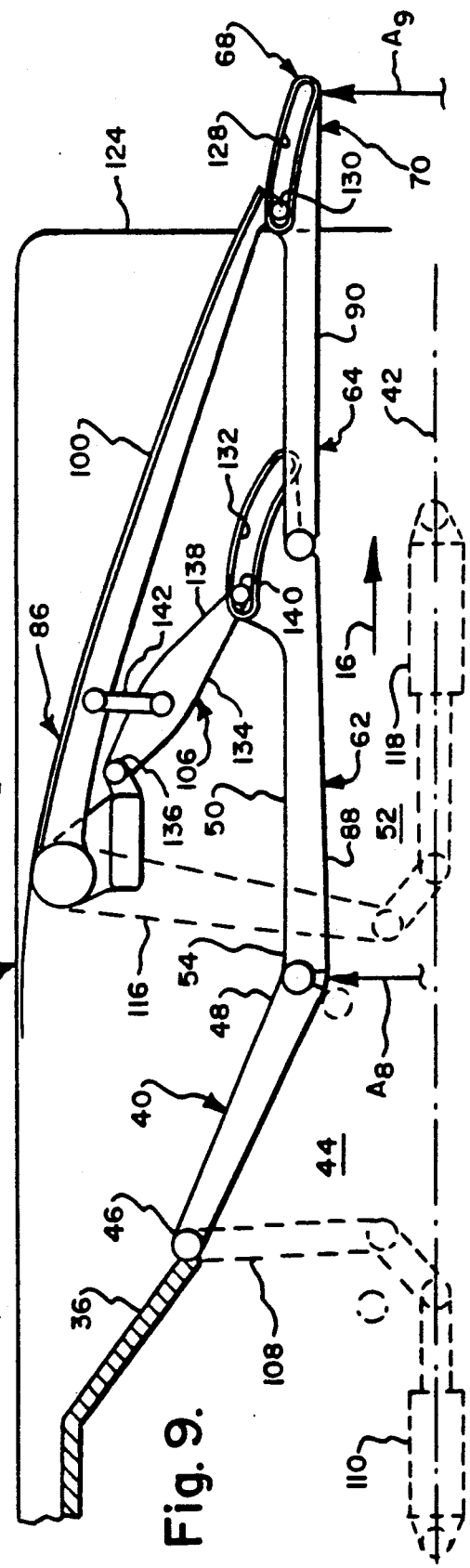

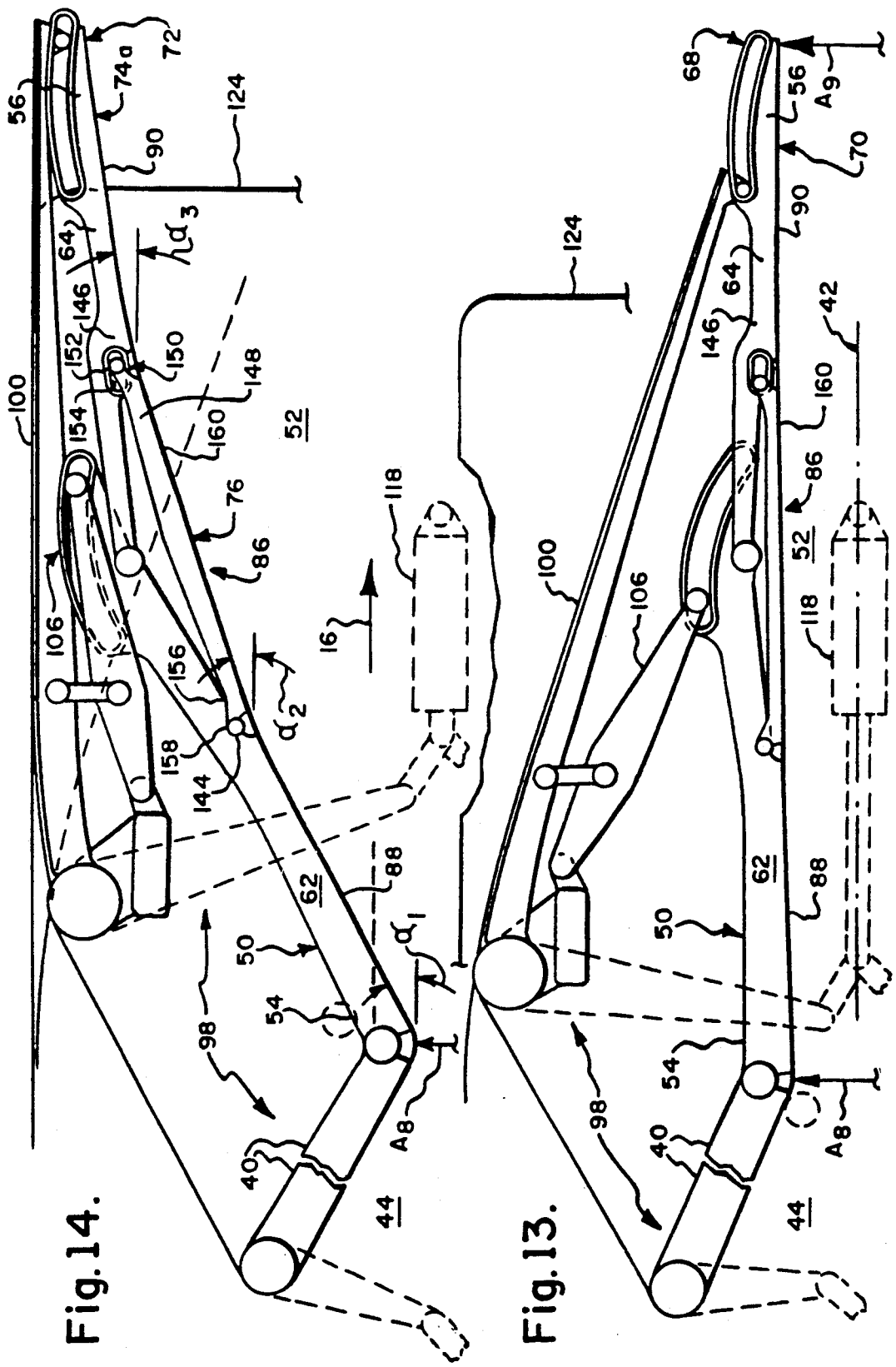

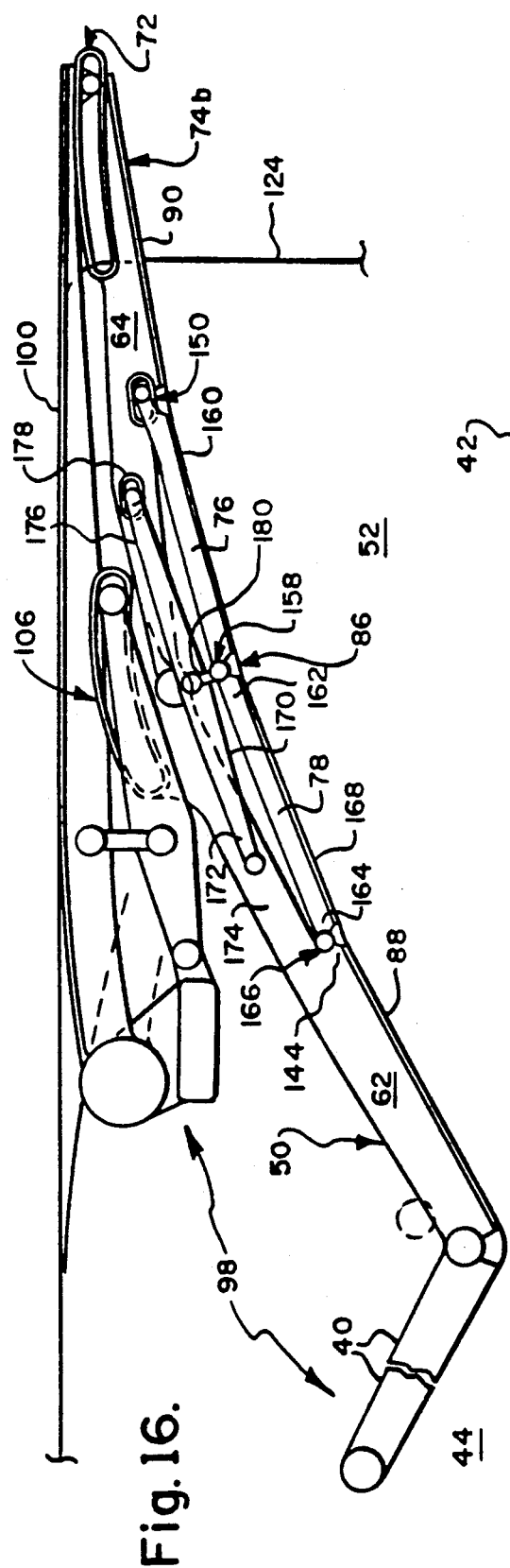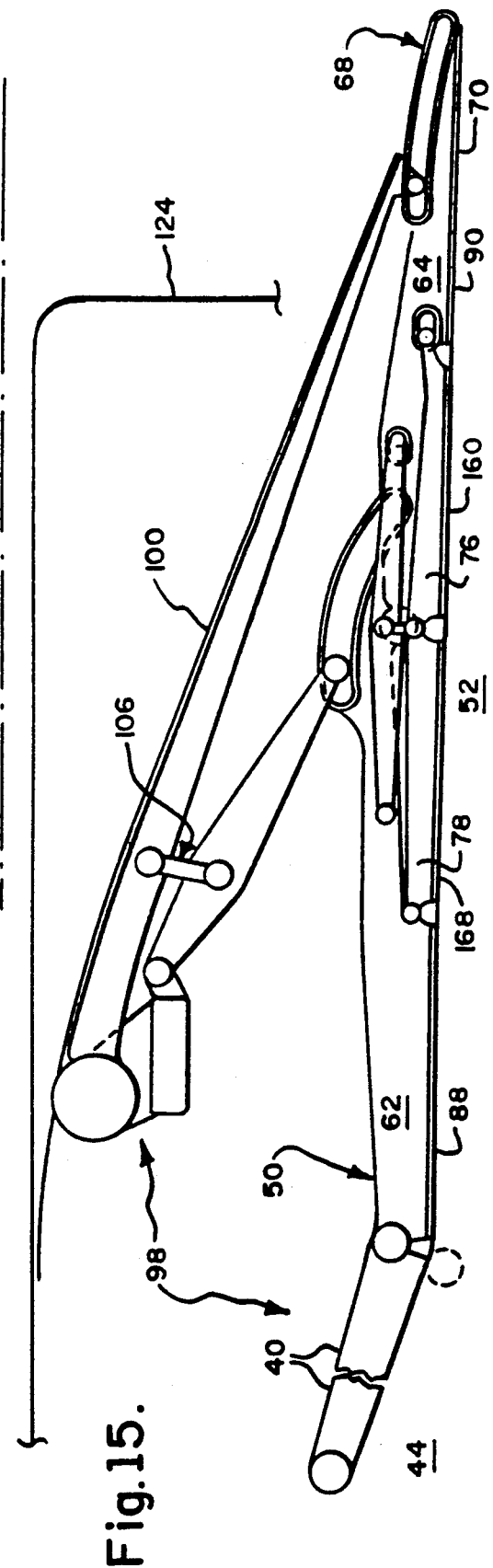

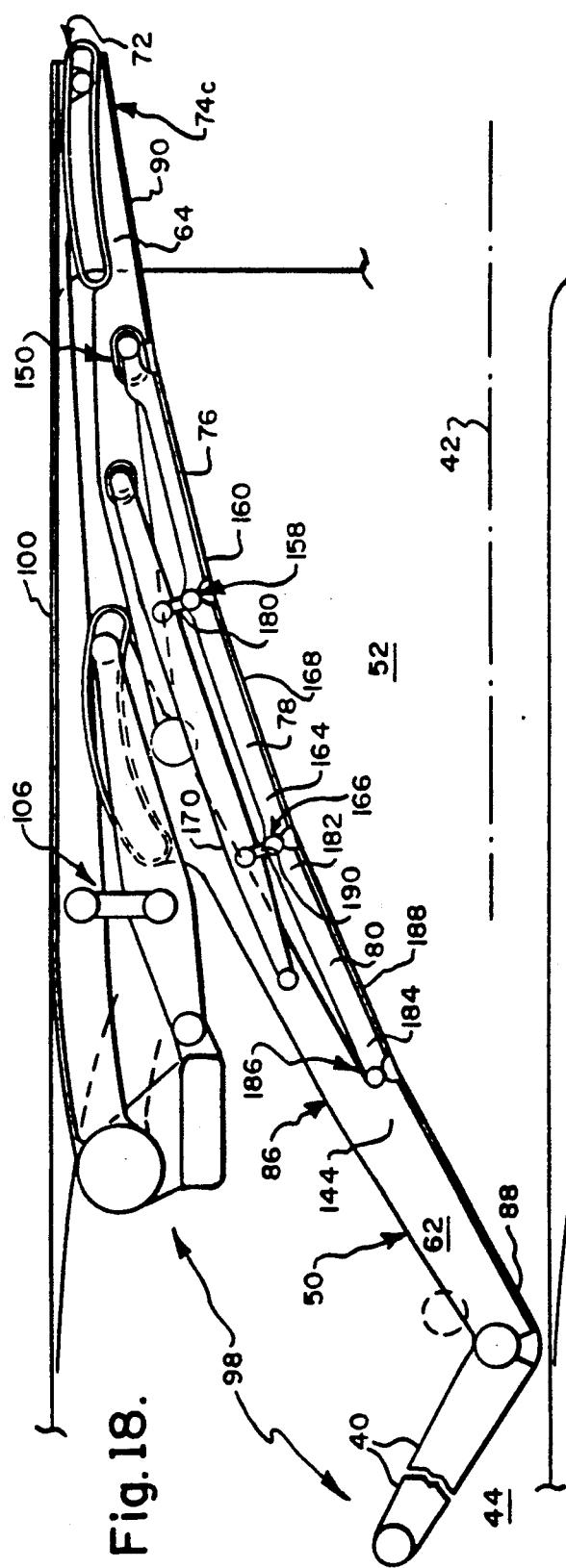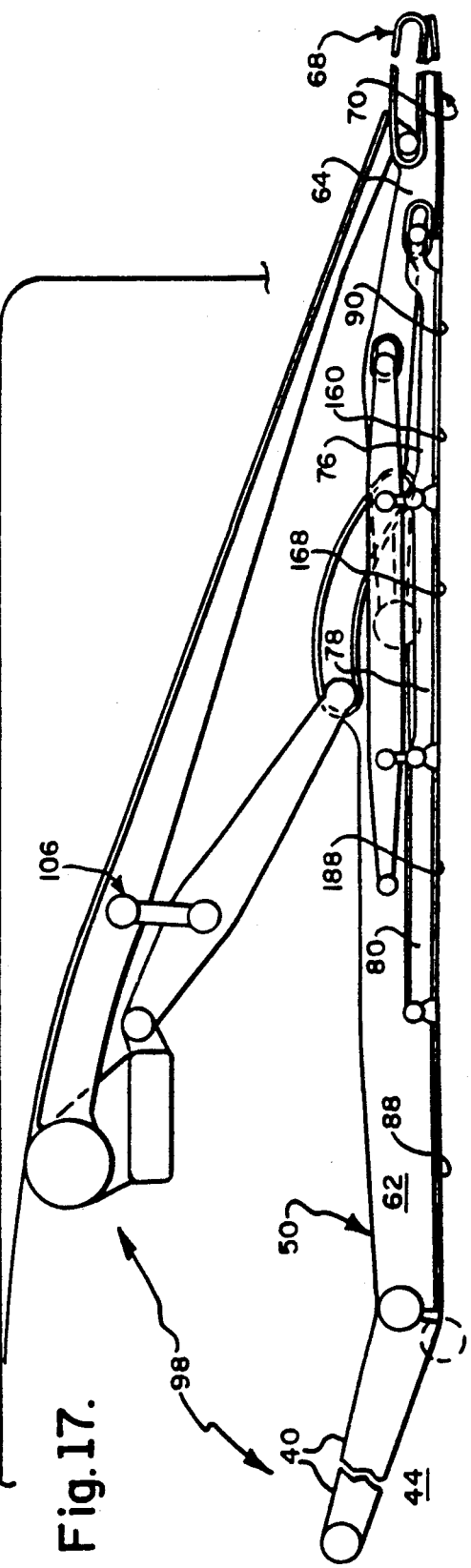

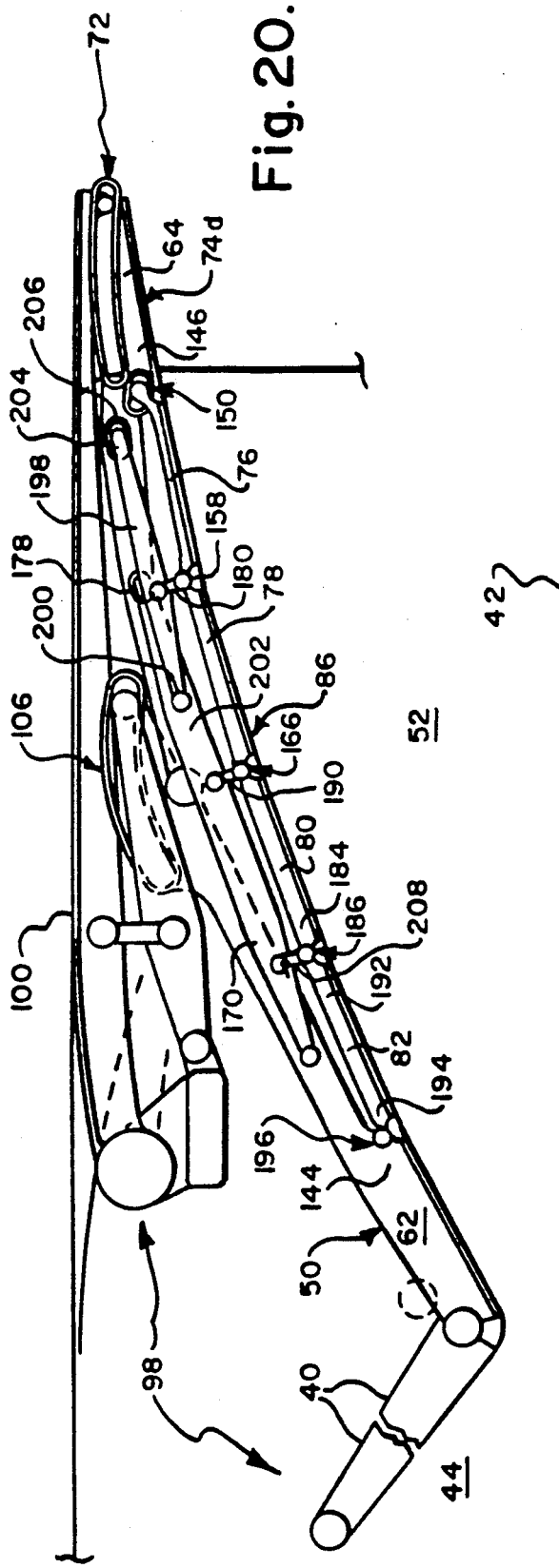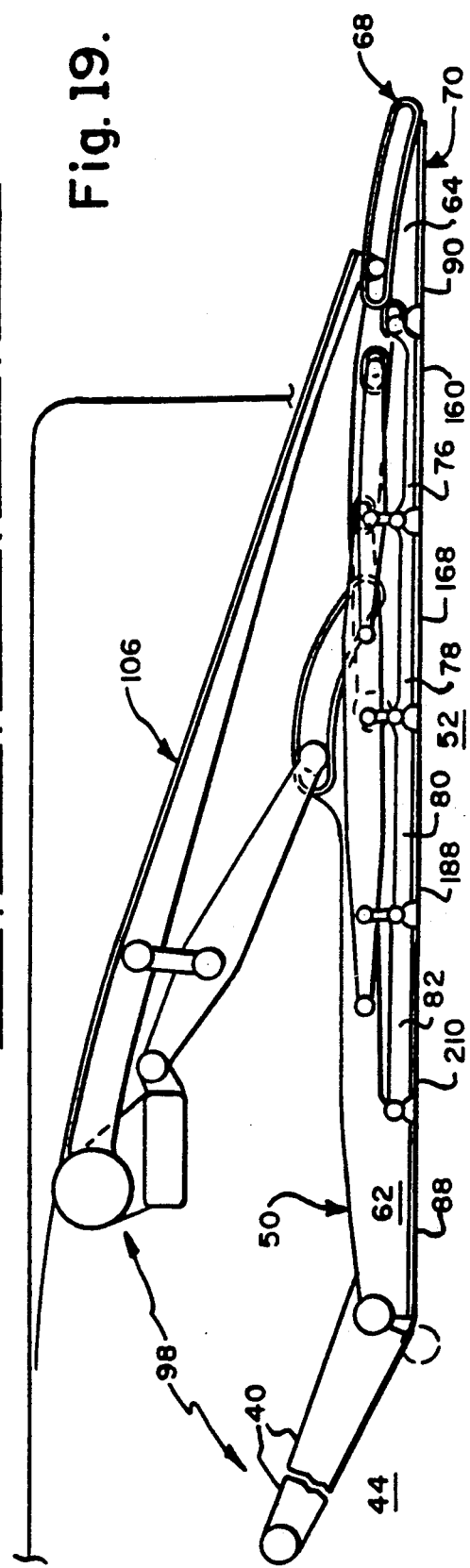

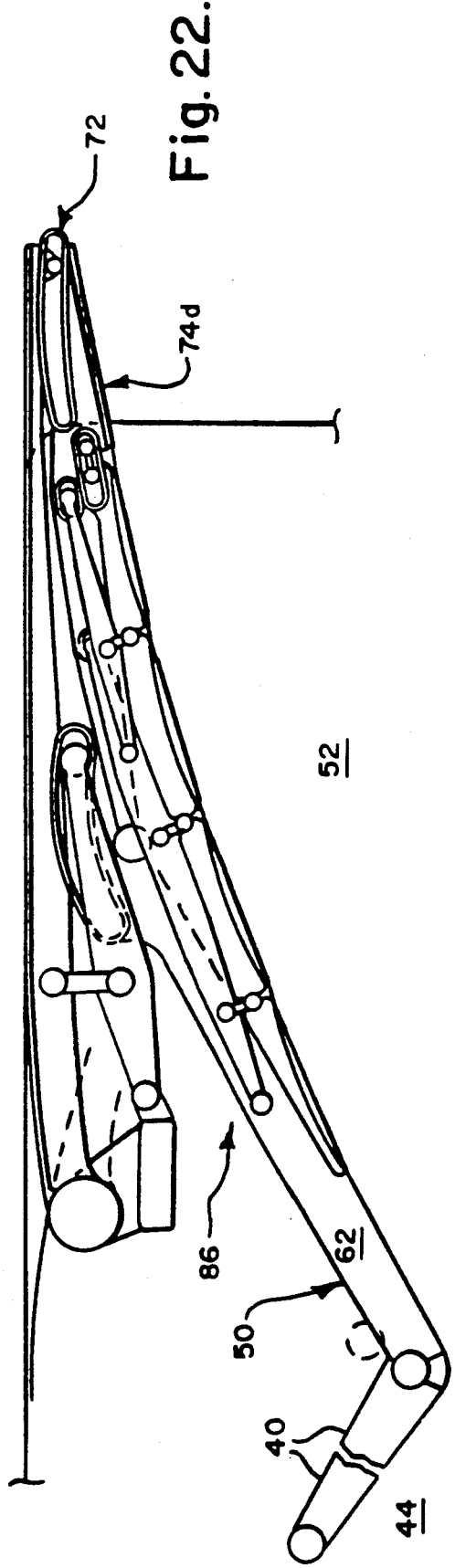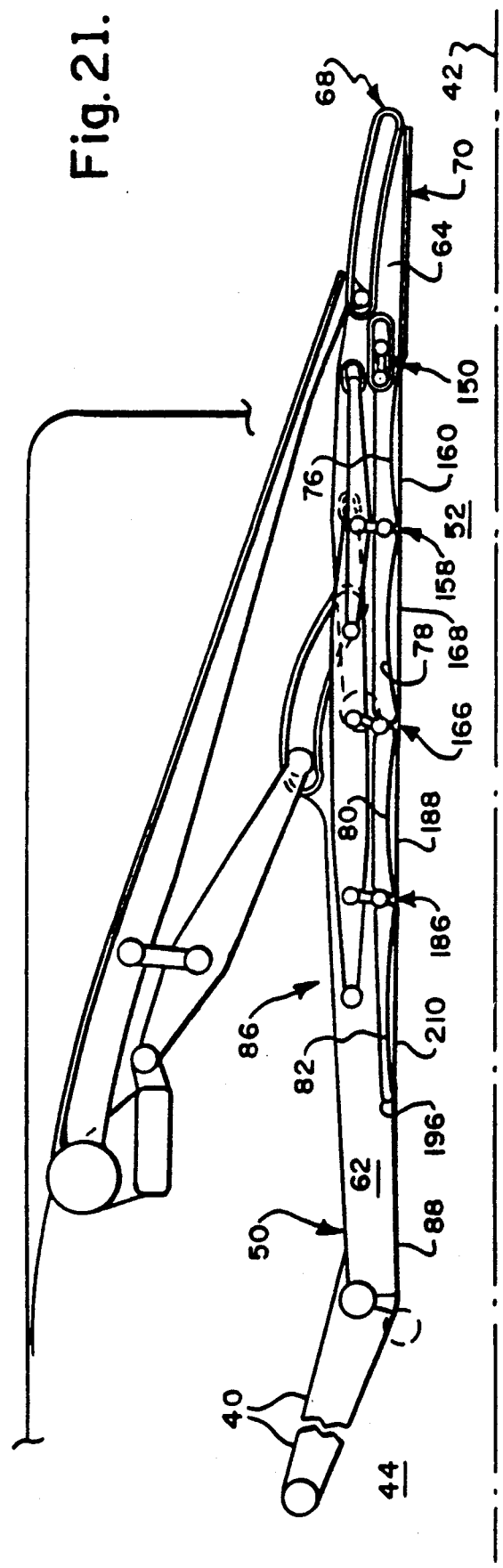

EXHAUST NOZZLE HAVING VARIABLE CONTOUR EXHAUST FLAP

TECHNICAL FIELD

The present invention relates generally to exhaust nozzles for aircraft engines, and, more specifically, to an exhaust nozzle for an engine powering an aircraft at relatively high supersonic velocity.

BACKGROUND ART

Conventional, high performance, supersonic military aircraft utilize a conventional afterburner and variable area, converging-diverging exhaust nozzle for providing high performance over a flight envelope ranging in speeds from subsonic to supersonic up to about Mach 2.5. The conventional exhaust nozzle includes primary exhaust flaps defining a straight sided converging channel, and secondary exhaust flaps extending downstream thereof to define a straight sided diverging channel. A throat of minimum flow area is disposed at the junction of the primary and secondary flaps and has a flow area conventionally designated $A_8$. The outlet of the exhaust nozzle is disposed at the downstream ends of the secondary flaps and has an outlet flow area conventionally designated $A_9$.

The ratio of the nozzle outlet area $A_9$ over the throat area $A_8$ varies during operation through the flight envelope by varying the positions of the primary and secondary flaps to accommodate variations in the conventionally known nozzle pressure ratio NPR defined as the total pressure of the combustion gases upstream of the converging channel divided by the static pressure downstream of the nozzle outlet i.e., ambient pressure. The NPR increases with increase in velocity of the aircraft, and for example may reach a value of about 30 at an aircraft speed of about Mach 2.5. Efficient expansion of combustion gases having high values of NPR requires a diverging channel having a relatively long length as compared to corresponding shorter length required for low NPR values.

Accordingly, the exhaust nozzle is designed for efficient expansion of the combustion gases at the highest expected NPR values, which necessarily results in a relatively long exhaust nozzle. The length of an exhaust nozzle directly affects its weight, complexity, and the amount of cooling air required for maintaining acceptable life of the exhaust nozzle, and, therefore, it is desirable to have exhaust nozzles as short as possible.

Advanced military aircraft are being considered for operation at speeds ranging from subsonic to relatively high supersonic greater than Mach 2.5 and up to about Mach 6. For example, the NPR value associated with Mach 6 operation of the aircraft is about 650 which is substantially higher than the NPR value of about 30 associated with flight at Mach 2.5. Accordingly, an exhaust nozzle utilized in such an aircraft must be designed for efficient expansion of combustion gases having such a relatively high NPR value. A conventional exhaust nozzle including conventional straight sided converging-diverging channels would be undesirably long for efficient expansion of the combustion gases at NPR values greater than 30 and up to about 650, and higher. The increased length would result in unacceptably high weight and complexity, and unacceptable cooling air requirements for such a nozzle. The cooling air typically is provided from compression in the aircraft engine, and any air not utilized for combustion, and utilized for cooling, for example, decreases the overall performance of the engine.

OBJECTS OF THE INVENTION

Accordingly, it is one object of the present invention to provide a new and improved method and apparatus for discharging combustion gases from an engine powering an aircraft at subsonic and supersonic velocities.

Another object of the present invention is to provide a method and exhaust nozzle providing efficient expansion of combustion gases at both low and high values of nozzle pressure ratio NPR.

Another object of the present invention is to provide a nozzle effective for efficient expansion of combustion gases at high values of NPR, greater than 30, which is relatively short, light and requiring relatively small amounts of cooling air.

Another object of the present invention is to provide a method and apparatus for efficient expansion of supersonic combustion gases through a diverging channel.

DISCLOSURE OF INVENTION

A method is disclosed for discharging combustion gases from an engine powering an aircraft at subsonic and supersonic velocities. The engine includes a variable area exhaust nozzle having primary and secondary flaps defining a generally converging channel and an exhaust channel, respectively for the combustion gases. The method comprises the steps of contouring the secondary flaps to a first contour at a first position at a first value of a nozzle pressure ratio NPR across the converging and exhaust channels. The method further includes the step of contouring the secondary flaps to a second contour at a second position at a second value of NPR. In a preferred embodiment, the first contour is straight at low values of NPR and the second contour is generally concave for high values of NPR. A preferred embodiment of an exhaust nozzle for carrying out the method includes the secondary flaps taking the form of a plurality of articulated secondary flap segments which are positionable collectively to form a straight contour at low NPR values and to form a generally concave contour at relatively high NPR values.

BRIEF DESCRIPTION OF DRAWINGS

The novel features believed characteristic of the invention are set forth and differentiated in the claims. The invention, in accordance with preferred and exemplary embodiments, together with further objects and advantages thereof, is more particularly described in the following detailed description taken in conjunction with the accompanying drawing in which:

FIG. 1 is a schematic representation of an aircraft operable at subsonic and supersonic velocity.

FIG. 2 is a schematic representation of one of the two engines powering the aircraft illustrated in FIG. 1 including an exhaust nozzle in accordance with one embodiment of the present invention.

FIG. 3 is a schematic representation of a symmetrical half portion of the exhaust nozzle illustrated in FIG. 2 showing a primary flap and two secondary flap segments at two positions corresponding to low and high nozzle pressure ratios.

FIG. 4 is a schematic representation of a symmetrical half portion of the exhaust nozzle illustrated in FIG. 2 showing another embodiment of the present invention showing a primary flap and three secondary flap segments disposed at two positions corresponding to low and high nozzle pressure ratios.

FIG. 5 is a schematic representation of a symmetrical half portion of the exhaust nozzle illustrated in FIG. 2 showing another embodiment of the present invention showing a primary flap and four secondary flap segments at two positions corresponding to low and high pressure ratios.

FIG. 6 is a schematic representation of a symmetrical half portion of the exhaust nozzle illustrated in FIG. 2 showing another embodiment of the present invention showing a primary flap and five secondary flap segments at two positions corresponding to low and high nozzle pressure ratios.

FIG. 7 is a schematic representation of a symmetrical half portion of the exhaust nozzle illustrated in FIG. 2 showing another embodiment of the present invention showing a primary flap and six secondary flap segments at two positions corresponding to low and high nozzle pressure ratios.

FIG. 8 is a graph plotting a coefficient of internal nozzle performance as a function of the number of secondary flap segments.

FIG. 9 is a schematic, transverse sectional view of a half portion of a symmetrical exhaust nozzle having two secondary flap segments disposed at a first position corresponding to a low nozzle pressure ratio.

FIG. 10 is a schematic, transverse sectional view of a half portion of a symmetrical exhaust nozzle having two secondary flap segments disposed at a second position corresponding to a high nozzle pressure ratio.

FIG. 13 is a schematic, transverse sectional view of a half portion of a symmetrical exhaust nozzle having three secondary flap segments disposed at a first position corresponding to a low nozzle pressure ratio.

FIG. 14 is a schematic, transverse sectional view of a half portion of a symmetrical exhaust nozzle having three secondary flap segments disposed at a second position corresponding to a high nozzle pressure ratio.

FIG. 15 is a schematic, transverse sectional view of a half portion of a symmetrical exhaust nozzle having four secondary flap segments disposed at a first position corresponding to a low nozzle pressure ratio.

FIG. 16 is a schematic, transverse sectional view of a half portion of a symmetrical exhaust nozzle having four secondary flap segments disposed at a second position corresponding to a high nozzle pressure ratio.

FIG. 17 is a schematic, transverse sectional view of a half portion of a symmetrical exhaust nozzle having five secondary flap segments disposed at a first position corresponding to a low nozzle pressure ratio.

FIG. 18 is a schematic, transverse sectional view of a half portion of a symmetrical exhaust nozzle having five secondary flap segments disposed at a second position corresponding to a high nozzle pressure ratio.

FIG. 19 is a schematic, transverse sectional view of a half portion of a symmetrical exhaust nozzle having six secondary flap segments disposed at a first position corresponding to a low nozzle pressure ratio.

FIG. 20 is a schematic, transverse sectional view of a half portion of a symmetrical exhaust nozzle having six secondary flap segments disposed at a second position corresponding to a high nozzle pressure ratio.

FIG. 21 is a schematic, transverse sectional view of a half portion of a symmetrical exhaust nozzle having six secondary flap segments disposed at a first position corresponding to a low nozzle pressure ratio, wherein five of the secondary flap segments therein are formed integrally.

FIG. 22 is a schematic, transverse sectional view of a half portion of a symmetrical exhaust nozzle having six secondary flap segments disposed at a second position corresponding to a high nozzle pressure ratio, wherein five of the secondary flap segments are integral.

MODE(S) FOR CARRYING OUT THE INVENTION

Figure 11:
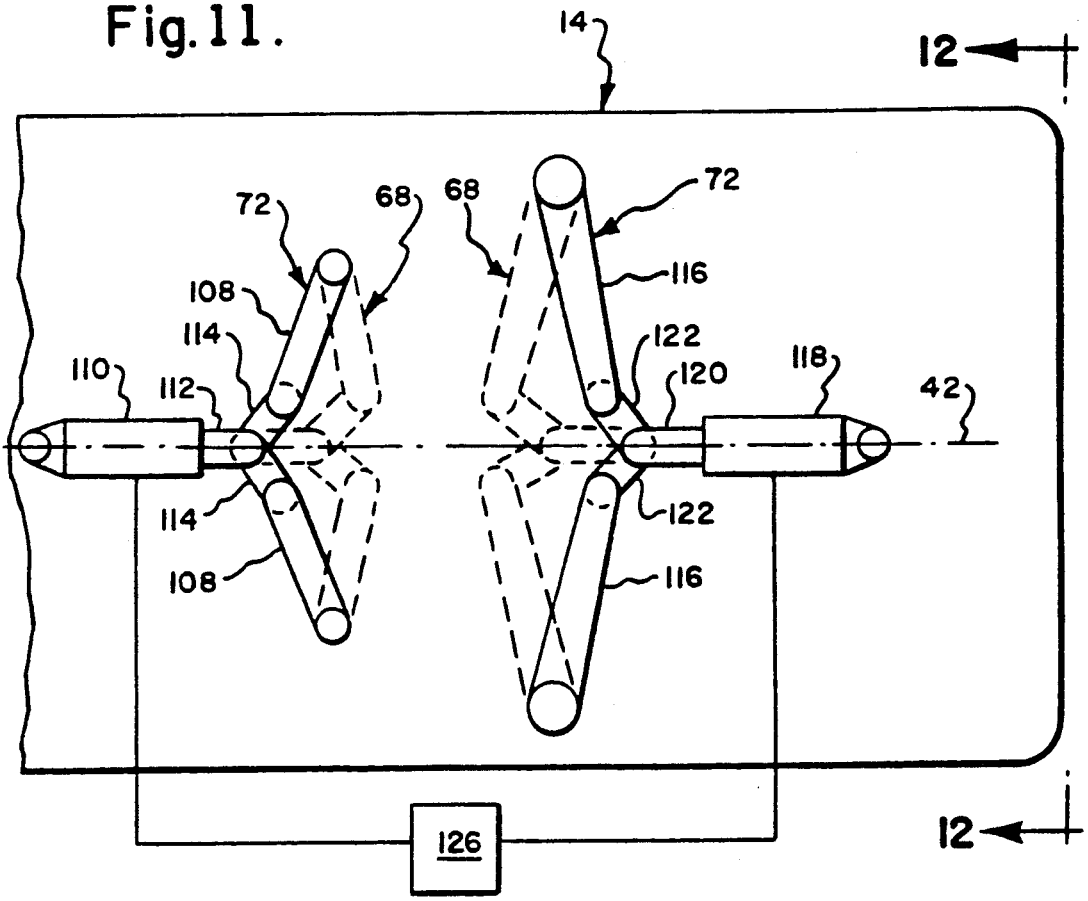
FIG. 11 is a side view, partly schematic view, of actuators and linkages for positioning the primary and secondary flaps of the embodiment of the exhaust nozzle illustrated in FIGS. 9 and 10.

Illustrated in FIG. 1 is an exemplary aircraft 10 including two conventional engines 12 each having an exhaust nozzle 14 in accordance with a preferred and exemplary embodiment of the present invention. The engines 12 generate combustion gases 16 which are discharged through the exhaust nozzles 14 for generating thrust for powering the aircraft 10. The engines 12 and exhaust nozzles 14 are effective for powering the aircraft 10 at subsonic and supersonic velocity up to about Mach 6.0 in this exemplary embodiment, although higher velocity embodiments may be utilized.

Illustrated in FIG. 2 is a schematic representation of one of the engines 12 and corresponding exhaust nozzle 14 of the aircraft 10 illustrated in FIG. 1. The engine 12 includes a conventional core engine 18 which may take the exemplary form of a conventional gas turbine engine including a fan, compressor, combustor, and high and low pressure turbines. The engine 12 includes an annular inlet 20 which receives ambient air 22, a portion of which is channeled through the core engine 18 and another portion of which is channeled through an annular bypass duct 24 surrounding the core engine 18. A conventional afterburner, or augmenter, 26 extends downstream from the core engine 18 and bypass duct 24, and includes a conventional combustion liner 28, flameholders 30 and fuel injectors 32.

The engine 10 in this exemplary embodiment, may be designated as a turbofan-ramjet engine which is operable as a conventional turbofan, or as a conventional ramjet by selective positioning of a bypass valve 34 extending from a downstream end of the core engine 18. The bypass valve 34 is positionable in a first, closed, ramjet position as shown in solid black lines for blocking the discharge of fluid flow from the core engine 18 while allowing flow in the bypass duct 24, and in a second, open, turbofan position designated 34a as shown in dashed line which opens the discharge from the core engine 18 while substantially blocking the discharge from the bypass duct 24. The bypass valve 34 may also be placed in intermediate turbofan positions between the first and second positions.

In operation, for conventional turbofan mode of operation of the engine 12, the bypass valve 34 is placed in the turbofan positions 34a and the engine 18 is conventionally operated for mixing fuel with the air 22 for generating the combustion gases 16 which are discharged into the afterburner 26 from idle operation of the engine 12 to intermediate power operation of the engine 12 up to relatively high subsonic speeds of the aircraft 10. The afterburner 26 is selectively operable for mixing additional fuel from the injectors 32 with the combustion gases 16 discharged from the core engine 18 and with a portion of bypass air channeled through the bypass duct 24 and past the bypass valve 34, which may be disposed at the intermediate positions, for generating additional energy and thrust from the combustion gases 16 for powering the aircraft 10 at high subsonic and relatively low supersonic velocities.

For powering the aircraft 10 at relatively high supersonic velocities up to about Mach 6.0, the bypass valve 34 is positioned in the ramjet position which substantially opens the bypass duct 24 and closes the discharge to the core engine 18, and the core engine 18 is deactivated and does not produce combustion gases. Instead, the inlet air 22 is pressurized by a ram effect due to the high velocity of the aircraft 10 and is channeled through the bypass duct 24 and into the afterburner 26 where it is mixed with fuel from the injectors 32 for generating the combustion gases 16. The combustion gases 16 in the ramjet mode of operation of the engine 12 are effective for powering the aircraft 10 at relatively high supersonic velocity ranging up to about Mach 6.0.

As described above, the engine 12 may be any type of conventional engine for generating the combustion gases 16 for powering the aircraft 10 from idle and through subsonic and supersonic velocities up to about Mach 6.0. Mach 6.0 is merely exemplary, the invention may be practiced for aircraft 10 operated at even higher velocities. In accordance with a preferred and exemplary embodiment of the present invention, the exhaust nozzle 14 which extends downstream from the afterburner 26 of the engine 12 provides for more efficient expansion of the combustion gases 16 in a relatively short length for practicing the method in accordance with the present invention. The exhaust nozzle 14 in this exemplary embodiment of the present invention is generally a two-dimensional, variable area converging-diverging type (2D C-D) exhaust nozzle having generally rectangular flow areas. The nozzle 14 includes a casing 36 having an inlet 38 for receiving the combustion gases 16 from the engine 12. The nozzle 14 also includes a plurality of opposing primary exhaust flaps 40 which face each other on opposite sides of a longitudinal centerline axis 42 of the nozzle 14, and of the engine 12. The primary flaps 40 define therebetween a generally converging channel 44 which is disposed in flow communication with the inlet 38. Each of the primary flaps 40 includes an upstream end 46, pivotally joined to the casing 36, and a downstream end 48.

The nozzle 14 also includes a plurality of opposing secondary exhaust flaps 50 extending downstream from the primary flaps 40 on opposite sides of the longitudinal centerline axis 42 to define therebetween an exhaust channel 52 in flow communication with the converging channel 44 for receiving the combustion gases 16 therefrom and discharging the combustion gases 16 from the nozzle 14 for generating thrust. Each of the secondary flaps 50 includes an upstream end 54, pivotally joined to a respective primary flap downstream end 48, and a downstream end 56. The secondary flap downstream ends 56 define an outlet 58 therebetween for discharging the combustion gases 16 from the nozzle 14.

Also conventionally utilized for defining a variable area exhaust nozzle, is a throat flow area $A_8$ which is the minimum flow area through an exhaust nozzle and, for example, is the area associated with a throat 60 disposed at the junction of the primary and secondary flaps 40 and 50 in the embodiment of the invention illustrated in FIG. 2. The conventional outlet flow area, designated $A_9$, is that flow area at the outlet of an exhaust nozzle, such as at the outlet 58 of the exhaust nozzle 14 illustrated in FIG. 2.

A conventional variable area exhaust nozzle utilized in a conventional supersonic aircraft has secondary flaps which are straight for expanding at supersonic velocity the combustion gases discharged therethrough at relatively high nozzle pressure ratio NPR. Nozzle pressure ratio NPR is a conventional parameter associated with exhaust nozzles and represents the pressure ratio across the exhaust nozzle, such as, for example, across the converging channel 44 and the exhaust channel 52 of the exhaust nozzle 14 illustrated in FIG. 2. The nozzle pressure ratio NPR is defined as the total pressure $P_t$ upstream of the converging channel 44 as illustrated in FIG. 2 divided by the static pressure $P_0$ downstream of the outlet 58, i.e., ambient pressure.

Accordingly, at relatively low NPR values typically associated with subsonic operation of the aircraft 10 and also typically associated with dry operation of the engine 12 wherein the afterburner 26 is not operated, conventional primary and secondary flaps are disposed in a relatively closed position for channeling and expanding the combustion gases 16 for obtaining thrust. A conventional aircraft so operated at relatively low NPR values also positions the secondary flaps in the relatively closed position for decreasing $A_9$ and the area ratio $A_9/A_8$ for efficient expansion of the combustion gases at low NPR values.

However, at relatively high NPR values in a conventional exhaust nozzle, the secondary flaps thereof must be placed in a generally open position for obtaining relatively high $A_9$ and area ratio $A_9/A_8$ for efficient expansion of the combustion gases at the relatively high NPR values associated with high velocity operation of the aircraft which occurs from discharging combustion gases at high volumes and velocities thereof. Since the NPR value is relatively high, for example up to about 30, the conventional secondary flaps which are straight must be relatively long in order to efficiently expand the combustion gases without undesirable overexpansion.

As NPR values further increase past about 30 for operation of an aircraft at high supersonic velocities greater than about Mach 2.5, the length of a conventional straight secondary flap must be correspondingly increased for efficient expansion of the combustion gases which results in an undesirably long diverging channel defined by the conventional secondary flaps. For operation of an aircraft at relatively high supersonic velocities, for example at about Mach 6.0, NPR values will typically approach about 650 which is substantially greater than the NPR value of about 30 associated with operation of the aircraft at Mach 2.5. A conventional, straight secondary flap exhaust nozzle would, therefore, have to be substantially long to efficiently expand the combustion gases associated with NPR ratios of about 650 which is undesirable. Furthermore, since the aircraft operates in a flight envelope ranging in speed from takeoff speeds through subsonic and supersonic speeds, the conventional exhaust nozzle must be variable for operation not only at the high NPR values associated with high supersonic speed but also at low NPR values associated with low speed operation of the aircraft.

Accordingly, in accordance with one object of the present invention, a new and improved method for discharging the combustion gases 16 from the engine 12 for powering the aircraft 10 in a flight envelope including velocities ranging from takeoff, subsonic and supersonic velocities, is provided. The method includes the step of contouring the secondary flaps 50 to a first contour at a first position of the secondary flaps 50 for discharging the combustion gases 16 through the exhaust channel 52 at a first, low value of the nozzle pressure ratio NPR across the converging and exhaust channels 44 and 52. The method also includes the step of contouring the secondary flaps 50 to a second contour at a second position of the secondary flaps 50 for discharging the combustion gases 16 through the exhaust channel 52 at a second, high value of NPR.

FIGS. 3-7 illustrate schematically various embodiments of the invention showing the first and second contours at respective first and second positions associated with the first and second values of NPR, respectively. FIG. 3 illustrates the simplest embodiment of the present invention wherein each of the secondary flaps 50 includes a first, forward flap segment 62 pivotally joined to a second, aft flap segment 64. One object of the present invention is to contour and position the secondary flaps 50 for optimally approaching isentropic expansion of the exhaust gases 16 channeled through the exhaust channel 52. A nearly ideal, isentropic contour 66 of the secondary flaps 50 is illustrated in FIGS. 3-7 in dashed-line. The isentropic contour 66 is generally concave toward the combustion gases 16 and is the thermodynamically optimum contour for expanding the combustion gases 16 at the high value of the nozzle pressure ratio NPR associated with the second position.

Accordingly, FIG. 3 illustrates one embodiment of the present invention wherein the secondary flaps 50 each include two flap segments, 62 and 64, for approximating the isentropic contour 66 at the second value of NPR, which is associated with a maximum value of NPR experienced by exhaust nozzle 14, which in an exemplary embodiment is about 650 at a flight speed of the aircraft 10 of about Mach 6.0. However, operation of the aircraft 10 at relatively low flight speeds associated with relatively low values of NPR, for example the first value of NPR of about 4 requires that the primary and secondary flaps 40 and 50 be placed in the relatively closed first position for efficient channeling of the combustion gases 16 therethrough.

Accordingly, the secondary flaps 50, including the forward and aft flap segments 62 and 64, are placed in a first position shown in dashed-line as 68 which provides relatively low, minimum values of $A_9$ and $A_9/A_8$ ratio associated with a correspondingly low, or first value of NPR. In the first position 68, the first contour of the secondary flaps 50, which is designated by the numeral 70, is substantially straight, and is generally parallel to the longitudinal centerline axis 42 at a relatively small angle thereto in the exemplary embodiment illustrated.

For operation of the exhaust nozzle 14 at the second NPR value which is high relative to the low NPR value associated with the first position 68, the secondary flaps 50 are placed in a second position 72 for providing relatively high values of $A_9$ and $A_9/A_8$ ratio associated with the first position 68. The second NPR value may be a maximum NPR value associated with operation of the exhaust nozzle 14 for propelling the aircraft 10 at maximum velocity, which for example may be a NPR value of about 650 associated with an aircraft velocity of about Mach 6.0. The second position 72 of the secondary flaps 50 provides corresponding maximum values of $A_9$ and $A_9/A_8$ ratio for a second contour 74 of the secondary flaps 50 which is generally concave toward the combustion gases 16 in the exhaust channel 52. In this embodiment, the forward and aft flap segment 62 and 64 are generally equal in length and each is straight and intersect each other obliquely at an obtuse angle for generating the generally concave second contour 74 for approximating the isentropic contour 66.

Because of the relative additional complexity of providing the flap segments 62 and 64 instead of a single secondary flap 50 the advantages of the present invention are more apparent at relatively high NPR values greater than about 30 associated with propulsion of the aircraft 10 at flight velocities greater than about Mach 2.5. Accordingly, the second, or high NPR value described above typically occurs at NPR values greater than about 30 and up to about 650 as described above. However, the invention may also be practiced for even higher NPR values greater than 650 if desired.

It is to be noted that the terms "contour" and "position" herein are independent and distinct. "Contour" represents the contour, or profile, of the inner surfaces of the secondary flaps 50 which faces and bounds the exhaust gases 16. In contrast, "position" represents the position of the secondary flaps 50 relative to the longitudinal axis 42 and is directly proportional to the outlet flow area $A_9$, for example. The secondary flaps 50 could be configured for obtaining identical "contours" at two different positions of the flaps 50, but this is not desirable. For example, if the second contour 74 occurred at the first position 68, performance of the exhaust channel 52 would be degraded.

Illustrated in FIG. 4 is another embodiment of the present invention wherein each of the secondary flaps 50 includes three flap segments i.e., the forward and aft flap segments 62 and 64 and a third flap segment 76 pivotally connected therebetween. Accordingly, the second contour, designated 74a is formed of three secondary flap segments to define the generally concave second contour 74a when the secondary flap segments 62, 64 and 76 are positioned at the second position 72 for approximating the isentropic contour 66.

Illustrated in FIG. 5 is another embodiment of the present invention wherein each of the secondary flaps 50 includes four flap segments i.e., forward 62, aft 64, third 76, and a fourth flap segment 78 pivotally joined between the third flap segment 76 and the forward flap segment 62. Accordingly, the second contour, designated 74b is formed of four secondary flap segments i.e., 62, 64, 76, and 78, to define the generally concave second contour 74b for approximating the isentropic contour 66 when the secondary flap segments are positioned at the second position 72.

Illustrated in FIG. 6 is another embodiment of the present invention wherein each of the secondary flaps 50 includes five flap segments, i.e., forward 62, aft 64, third 76, fourth 78, and a fifth flap segment 80 pivotally connected between the fourth flap segment 78 and the forward flap segment 62. Accordingly, the second contour, designated as 74c, is formed of five secondary flap segments i.e., 62, 64, 76, 78, and 80, to define the generally concave second contour 74c for approximating the isentropic contour 66 when the secondary flap segments are positioned at the second position 72.

Illustrated in FIG. 7 is yet another embodiment of the present wherein each of the secondary flaps 50 includes six flap segments i.e., forward 62, aft 64, third 76, fourth 78, fifth 80, and a sixth flap segment 82 pivotally connected to the flap segment 80 and the forward flap segment 62. Accordingly, the second contour, designated 74d is formed of six secondary flap segments i.e., 62, 64, 76, 78, 80, and 82, to define the generally concave second contour 74d for approximating the isentropic contour 66 when the secondary flap segments are positioned at the second position 72.

In all the above embodiments of the invention illustrated in FIGS. 3-7, the secondary flap segments are preferably equal in length and each is straight. When each secondary flap 50 is placed in its respective secondary position 72, the individually straight flap segments intersect adjacent flap segments at obtuse angles for generating a generally concave second contour 74. When the secondary flaps 50 of the five embodiments illustrated in FIGS. 3-7 are placed in the respective first positions 68, the individual flap segments are aligned colinearly for collectively forming a straight, first contour 70, which is preferred for low NPR values associated with the first position 68.

FIG. 8 is a graph generated analytically which plots on its abscissa the number of segments forming each secondary flap 50 against its ordinate representing a coefficient of nozzle internal maximum performance designated $C_{fg}$ represented by the curve 84. The $C_{fg}$ curve 84 indicates about a one percent reduction in $C_{fg}$ when two flap segments, such as illustrated in the FIG. 3 embodiment, are utilized when compared with a conventional single secondary flap. This one percent decrease of internal performance is substantial and is attributed to shock wave losses which occur due to the relatively large intersection angle between the adjacent flap segment 62 and 64 in the FIG. 3 embodiment when placed in the second position 72. The $C_{fg}$ curve also indicates that the coefficient of internal performance is greater than that for a single secondary flap when three or more secondary flap segments are utilized. The improved performance is due in part to the relatively smaller intersection angles between adjacent flap segments as more flap segments are utilized for better approximating the isentropic contour 66.

For example, in the embodiment illustrated in FIG. 4 utilizing three flap segments, the forward flap segment 62 is disposed relative to the longitudinal centerline axis at a first acute inclination angle $\alpha_1$, the third flap segment 76 is disposed relative to the centerline axis 42 at a second acute inclination angle $\alpha_2$, and the aft flap segment 64 is disposed relative to the centerline axis 42 at a third acute inclination angle $\alpha_3$. In a preferred embodiment of the invention, the flap segments are of equal length, with each having a length designated $\frac{1}{3}L$ wherein L represents the overall length of the three segments 62, 64 and 76.

Also in a preferred embodiment, the three segments 62, 64 and 76 are positioned relative to each other so that $\alpha_2 - \alpha_1$ equals $\alpha_3 - \alpha_2$ which indicates that the obtuse intersection angles between adjacent flap segments are equal and therefore have relatively minimum values. Such intersection angles are necessarily less than the one intersection angle between the forward and aft flaps 62 and 64 illustrated in FIG. 3, which reduces losses associated with shock occurring at each of the intersections between the respective flap segments.

Shock occurs since the exhaust channel 52, for NPR values greater than about 1.85 results in supersonic flow of the combustion gases 16 through the exhaust channel 52. Of course, since the aircraft 10 operates over a range of velocities, the secondary flaps 50 operate over a range of positions from the first position 68 to the second position 72. The inclination angles of the respective secondary flap segments represented by $\alpha_1, \alpha_2, \alpha_3, \ldots$, vary from maximum values associated with the second position 72 to minimum values associated with the first position 68. In the preferred embodiment, the minimum values of $\alpha_1$, $\alpha_2$, and $\alpha_3$ are about zero. However, although the secondary flap 50 is shown in the first position 68 as being generally parallel to the longitudinal centerline 42, in other embodiments of the invention, it may be aligned obliquely thereto. However, the intersection angles between adjacent flap segments, e.g., segments 62, 64, and 76 have minimum values associated with the second position 72, and maximum values of 180° for generating the substantially straight first contour 70.

Various embodiments of the exhaust nozzle 14 may be configured for implementing the preferred method of the present invention for obtaining the first and second contours 70 and 72 at the first and second positions 68 and 72, respectively, at relatively low and relatively high NPR values, respectively. The exhaust nozzle embodiments may include both conventionally known two-dimensional converging-diverging (2D C-D) type, generally rectangular nozzles or conventionally known axisymmetric nozzles, or other types of nozzles. Illustrated in FIGS. 9-12 is one embodiment of exhaust nozzle 14 in the form of a 2D C-D nozzle. Illustrated in FIG. 9 is a nozzle 14 which includes each of the primary flaps 40 pivotally connected to the casing 36 at its upstream end 46 and pivotally connected at its downstream end 48 to a respective secondary flap 50. Means 86 are provided for contouring the secondary flaps 50 to the first contour 70 at the first position 68 at a minimum value of the outlet flow area A9 for discharging the combustion gases 16 through the exhaust channel 52 at the first value of NPR as shown in FIG. 9, and to the second contour 74 at the second position 72 having a maximum value of the outlet flow area A9, as illustrated in FIG. 10, for discharging the combustion gases 16 through the exhaust channel 52 at the second value of NPR. Associated with the minimum outlet flow area A9 is a minimum A9/A8 ratio, and associated with the maximum outlet flow area A9 is a maximum A9/A8 ratio. The first NPR value is about 4, which represents a minimum NPR value, and the second NPR value is about 650, which represents a maximum NPR value for this exemplary embodiment.

The contouring means 86 in accordance with an exemplary embodiment, comprises each of the secondary flaps 50 including the forward flap 62 having an inner surface 88 facing the combustion gases 16, and the aft flap segment 64 having an inner surface 90 facing the combustion gases 16. The upstream and downstream ends 54 and 56 of the secondary flaps 50 are the same as the upstream and downstream ends of the forward flap 62 and aft flap 64, respectively. The forward flap 62 includes a downstream end 92 which is pivotally connected to an upstream end 94 of the aft flap 64 to define an intermediate joint 96 about which the aft flap 64 may rotate relative to the forward flap 62.

The contouring means 86 further includes means 98 for positioning the primary and secondary flaps 40 and 50 which includes a plurality of outer flaps 100 spaced radially outwardly from and surrounding the secondary flaps 50. Each of the outer flaps 100 includes an upstream end 102 pivotally joined to the casing 36, and a downstream end 104 pivotally and slideably joined to a respective one of the aft flap downstream ends 56.

The positioning means 98 also includes linkage means 106 pivotally joining each of the outer flaps 100 to a respective forward flap segment 62 for controlling position of the intermediate joint 96 in response to position of the outer flap 100. The positioning means 98 further includes a plurality of primary levers 108 each fixedly joined to each of the primary flap upstream ends 46 for rotation therewith as illustrated in dashed line in FIGS. 9 and 10 and as more particularly illustrated in FIG. 11. A primary actuator 110, such as a hydraulic actuator, includes an extendable primary rod 112 pivotally connected by idler links 114 to the primary levers 108 for rotating the primary flaps 40 about the upstream ends 46 for varying the throat area $A_8$.

Positioning means 98 also includes a plurality of secondary levers 116 fixedly joined to each of the outer flap upstream ends 102 for rotation therewith, and a secondary actuator 118, such as a hydraulic actuator, having an extendable secondary rod 120 pivotally joined to a pair of secondary idler links 122, each of which is pivotally joined to a respective one of the secondary levers 116 for rotating the outer flaps 100 about the upstream ends 102 for varying the outlet flow area $A_9$.

Figure 12:
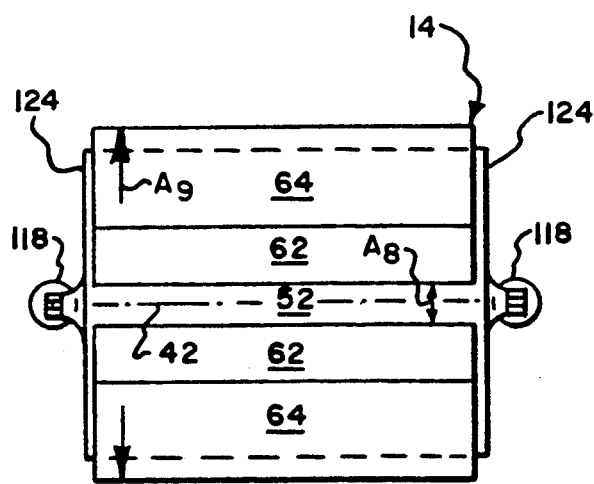
FIG. 12 is an upstream end view of the exhaust nozzle illustrated in FIG. 11 taken along line 12—12.

As illustrated in FIGS. 11 and 12, the primary and secondary actuators 110 and 118 are located externally of the converging and exhaust channels 44 and 52 and are suitably connected to spaced sidewalls 124 which form a part of the casing 36 and along with the primary and secondary flaps 40 and 62 define the converging and exhaust channels 44 and 52. Conventional fluid supply and control means 126 are operatively connected to the primary and secondary actuators 110 and 118 for extending and retracting the rods 112 and 120. As illustrated in FIG. 11, the levers 108 and 116 are shown in solid line at the second position 72 associated with the second contour 74 shown in FIG. 10 when the rods 112 and 120 are in a retracted position, and are shown in dashed outline at the first position 68 associated with the first contour 70 shown in FIG. 9 when the rods 112 and 120 are in a fully extended position.

As illustrated in FIGS. 9 and 10, the positioning means 98 further includes an elongate aft cam slot 128 fixedly joined to each of the secondary flap downstream ends 56, and an aft roller 130 pivotally joined to the outer flap downstream end 104 and slideably engaged in the aft cam slot 128 for allowing the outer flap downstream end 104 to pivot and slide relative to the secondary flap downstream end 56.

The linkage means 106 includes an elongate intermediate cam slot 132, fixedly joined to each of the forward flap downstream ends 92, and a driven link 134 having an upstream end 136 pivotally connected to the casing 36, and a downstream end 138 having an intermediate roller 140 pivotally and slideably engaged in the intermediate cam slot 132. A driver link 142 is pivotally joined to intermediate portions of the outer flap 100 and the driven link 134.

The positioning means 98 is effective for positioning the forward and aft flap segment inner surfaces 88 and 90 colinearly in the first position 68 as illustrated in FIG. 9 for forming the first contour 70. It is also effective for positioning the inner surfaces 88 and 90 obliquely to each other in the second position 72 illustrated in FIG. 10 for forming the second contour 74. The aft and intermediate cam slots 128 and 132 are effective for accommodating relative movement of the secondary flap 50, driven link 142 and outer flap 100 as the secondary flap 50 is positioned from the first position 68 to the second position 72.

Illustrated in FIGS. 13 and 14 is another embodiment of the present invention wherein the secondary flap 50 includes three flap segments corresponding to the embodiment illustrated in FIG. 4. The arrangement of the elements illustrated in FIGS. 13 and 14 is generally similar to the arrangement illustrated in FIGS. 9 and 10 except for the use of three flap segments and required changes for accommodating the three segments. The positioning means 98 and the linkage means 106 are generally the same as those illustrated in FIGS. 9 and 10 except for required sizing and configuration changes. In the embodiment illustrated in FIGS. 13 and 14, the contouring means 86 further includes the forward flap segment inner surface 88 extending from the forward flap upstream end 54 to a first intermediate portion 144 of the forward flap segment 62, and the aft flap segment inner surface 90 extends from the aft flap segment downstream end 56 to a first intermediate portion 146 of the aft flap segment 64. Each of the secondary flaps 50 further includes the third flap segment 76 having a downstream end 148 pivotally and slideably joined to the first intermediate portion 146 of the aft flap segment 64 to define a first articulated joint 150. The first articulated joint 150 includes a roller 152 on the downstream end 148 which pivotally and slideably engages an elongate cam slot 154 disposed in the first intermediate portion 146. The third flap segment 76 also includes an upstream end 156 pivotally joined to the first intermediate portion 144 to define a second articulated joint 158. The third flap segment 76 includes a preferably straight inner surface 160 extending from the downstream end 148 to the upstream end 156.

By this arrangement of the third flap 76 pivotally connected to both the forward flap 62 and the aft flap 64, the third flap segment 76 is positioned in response to relative angular position of the forward and aft flap segments 62 and 64 to form the second contour 74 including the forward, third and aft flap segments 62, 76, and 64 joining each other at the first and second articulated joints 150 and 158 to define the three straight sided generally concave second contour 74a including the forward, third, and aft flap segment inner surfaces 88, 160, and 90, respectively. The roller 152 in the cam slot 154 accommodates relative expansion and contraction of the forward flap 62 and the aft flap 64 with the third flap 76 during movement of the secondary flaps 50 from the first position 68 as illustrated in FIG. 13 to the second position 72 as illustrated in FIG. 14.

Since the inner surfaces 88, 160 and 90 are preferably straight in this exemplary embodiment, when the secondary flap 50 assumes its first position 68 as illustrated in FIG. 13, the three inner surfaces 88, 160 and 90 are colinearly aligned to collectively form a straight line surface. When the secondary flaps 50 are positioned in the second position 72 as illustrated in FIG. 14, the inner surfaces 88, 160, and 90, intersect each other at obtuse angles at the first and second articulated joint 150 and 158 and are disposed at the inclination angles $\alpha_1$, $\alpha_2$, and $\alpha_3$ as illustrated in FIG. 4 and as described above. In the preferred embodiment, the forward, third, and aft flap segment inner surfaces 88, 160, and 90, respectively, are positioned so that $\alpha_2 - \alpha_1$ equals $\alpha_3 - \alpha_2$ for reducing losses due to shock waves in the combustion gases 16 flowable in the exhaust channel 52 at the high NPR value associated with the second position 72. Furthermore, in the preferred embodiment as illustrated in FIGS. 4, 13 and 14, the inner surfaces 88, 160 and 90 of the flap segments are of equal length.

Illustrated in FIGS. 15 and 16 is another embodiment of the present invention wherein the secondary flaps 50 include four flap segments corresponding to the embodiment of the invention illustrated in FIG. 5. FIG. 15 shows the secondary flaps 50 in the first position 68 for forming the first contour 70, and FIG. 16 shows the secondary flaps 50 in the second position 72 for forming the second contour 74b.

The four-flap embodiment of the invention illustrated in FIGS. 15 and 16 is generally similar to the three-flap embodiment illustrated in FIGS. 13 and 14 and includes generally similar positioning means 98 and linkage means 106 sized and configured for the embodiment illustrated in FIGS. 15 and 16. The contouring means 86 further includes each of the secondary flaps 50 including the fourth flap segment 78 pivotally joining the third flap segment 76 to the forward flap segment 62 and having a downstream end 162 pivotally joined to the third flap segment 76 to define the second articulated joint 158, and having an upstream end 164 pivotally joined to the forward flap segment first intermediate portion 144 to define a third articulated joint 166. An inner surface 168 extends between the downstream and upstream ends 162 and 164 of the fourth flap segment 78.

In this embodiment of the invention, an elongate first positioning bar 170 is disposed radially outwardly of the third and fourth flap segments 76 and 78 and has an upstream end 172 pivotally connected to the forward flap segment at a second intermediate portion 174. The bar 170 also includes a downstream end 176 pivotally and slideably connected to the aft flap segment 64 at a second intermediate portion 178 in a manner similar to the first articulated joint 150. A first positioning link 180 pivotally joins the bar 170 to the second articulated joint 158 to support the joint 158 to the forward and aft flap segments 62 and 64.

The first and third articulated joints 150 and 166 are directly positioned with the aft and forward flap segments 64 and 62, respectively, and the second articulated joint 158 is indirectly positioned by the first positioning bar 170 in response to relative angular position of the aft and forward flap segments 64 and 62 to form the second contour 74b from the forward, aft, third and fourth flap segment inner surfaces 88, 90, 160, and 168, respectively.

In the embodiment illustrated in FIGS. 15 and 16, the forward, aft, third, and fourth flap segment inner surfaces 88, 90, 160, and 168 are each straight and of equal length. When disposed in the second position 72 shown in FIG. 16, these inner surfaces form the second contour 74b which is a four straight sided generally concave surface. When the secondary flaps 50 are positioned in the first position 68 as illustrated in FIG. 15, the forward, aft, third and fourth flap segment inner surfaces 88, 90, 160 and 168 are disposed colinearly and form collectively a straight line for the first contour 70.

Illustrated in FIGS. 17 and 18 is another embodiment of the present invention wherein the secondary flaps 50 include five flap segments corresponding with the embodiment of the invention illustrated in FIG. 6. The five-flap embodiment illustrated in FIGS. 17 and 18 is generally similar to the four-flap embodiment illustrated in FIGS. 15 and 16 with the positioning means 98 and the linkage means 106 being sized and configured for this arrangement. Each of the secondary flaps 50 includes the fifth flap segment 80 pivotally joining the fourth flap segment 78 to the forward flap segment 62 and having a downstream end 182 pivotally connected to the fourth flap segment upstream end 164 to define the third articulated joint 166. The fifth flap segment 80 also includes an upstream end 184 pivotally connected to the forward flap segment first intermediate portion 144 to define a fourth articulated joint 186. The fifth flap segment 80 includes a preferably straight inner surface 188 extending between the downstream and upstream ends 182 and 184.

The first positioning bar 170 in this embodiment, is disposed radially outwardly of the third, fourth and fifth flap segments 76, 78 and 80 and, a second positioning link 190 pivotally joins the first positioning bar 170 to the third articulated joint 166. In this embodiment, the second and third articulated joints 158 and 166 are indirectly positioned by the first positioning bar 170 and the first and second positioning links 180, 190, respectively, in response to relative angular position of the forward and aft flap segments 62 and 64. In a preferred embodiment, each of the flap segment inner surfaces 88, 188, 168, 160, and 90, is straight and of equal length and collectively form a straight line generally parallel to the longitudinal centerline axis 42 in the first contour 70 at the first position 68 illustrated in FIG. 17, and the five straight sided generally concave second contour 74d, at the second position 72 illustrated in FIG. 18.

Illustrated in FIGS. 19 and 20 is another embodiment of the present invention wherein the contouring means 86 further includes the sixth flap segment 82 corresponding to the embodiment of the invention illustrated in FIG. 7. Each of the secondary flaps 50 includes the sixth flap segment 82 pivotally joining the fifth flap segment 80 to the forward flap segment 62. The sixth flap segment 82 has a downstream end 192 pivotally connected to the fifth flap segment upstream end 184 to define the fourth articulated joint 186, and an upstream end 194 pivotally connected to the forward flap segment first intermediate portion 144 to define a fifth articulated joint 196. The first positioning bar 170 in this embodiment of the invention is disposed radially outwardly of the third, fourth, fifth, and sixth flap segments 76, 78, 80 and 82. An elongate second positioning bar 198 is disposed radially outwardly of the third and fourth flap segment 76 and 78 and radially inwardly of the first positioning bar 170 and has an upstream end 200 pivotally connected to an intermediate portion 202 of the first positioning bar 170, and a downstream end 204 pivotally and slideably connected to a third intermediate portion 206 of the aft flap segment 64 in a manner similar to that of the first articulated joint 150. The third intermediate portion 206 is disposed between the first intermediate portion 146 and the second intermediate portion 178 of the aft flap segment 64.

The first positioning link 180 in this embodiment, pivotally joins the second articulated joint 158 to the second positioning bar 198 for joining the second articulated joint 158 to the first positioning bar 170. A third positioning link 208 pivotally joins the first positioning bar 170 to the fourth articulated joint 186. The second, third, and fourth articulated joints 158, 166, and 186, are indirectly positioned by the first and second positioning bars 170 and 198, in response to relative angular position of the forward and aft flap segments 62 and 64 to form the second contour 74d at the second position 72 as illustrated in FIG. 20. The sixth flap segment 82 includes an inner surface 210 extending between the downstream and upstream ends 192 and 194. The forward, aft, third, fourth, fifth and sixth flap segment inner surfaces 88, 90, 160, 168, 188, and 210, respectively, are preferably each straight and of equal length and are disposed colinearly with respect to each other collectively to form a straight line for the first contour 70 at the first position 68 illustrated in FIG. 19, and are disposed obliquely to each other at obtuse angles therebetween to form the second contour 74d at the second position 72 as illustrated in FIG. 20 for forming a six straight sided generally concave second contour 74d.

Illustrated in FIGS. 21 and 22 is another embodiment of the present invention wherein the contouring means 86 includes six flap segments and is generally identical to the six-flap embodiment illustrated in FIGS. 19 and 20, which corresponds to the embodiment illustrated in FIG. 7. Whereas in the above described two-six flap embodiments of the invention, each individual flap segment 62, 64, 76, 78, 80, and 82 were independent and distinct segments pivotally joined to each other. In the embodiment illustrated in FIGS. 21 and 22, the forward flap segment 62 includes integral therewith the third, fourth, fifth and sixth flap segments 76, 78, 80, and 82. The third flap segment 76 is pivotally connected to the aft flap segment 64 at the first articulated joint 150 as described above. However, the third, fourth, fifth, and sixth flap segment 76, 78, 80, and 82 are integral but have flexible portions, which may be obtained by having relatively thin portions thereof at and to define the second, third, fourth and fifth articulated joints 158, 166, 186, and 196. The flap segments merely bend at such articulated joints for creating along with the forward and aft flaps 62 and 64 a first, straight line, contour 70 at the first position 68 as illustrated in FIG. 21, and the six-sided, generally concave second contour 74d at the second position 72 as illustrated in FIG. 22.

Of course, the integral, flexible type flap segments utilized in the embodiment of the invention illustrated in FIGS. 21 and 22 could be also used in any of the above-described embodiments of the invention as well.

All of the above embodiments of the invention, comprise an exhaust nozzle 14 of the 2D C-D nozzle type which defines a generally rectangular throat area $A_8$ and outlet area $A_9$ as illustrated, for example in FIG. 12. In these 2D embodiments, respective ones of the primary flaps 40 and the secondary flaps 50 are disposed on opposite sides of the longitudinal centerline axis 42 to define the converging and exhaust channels 44 and 52.

Figure 24:
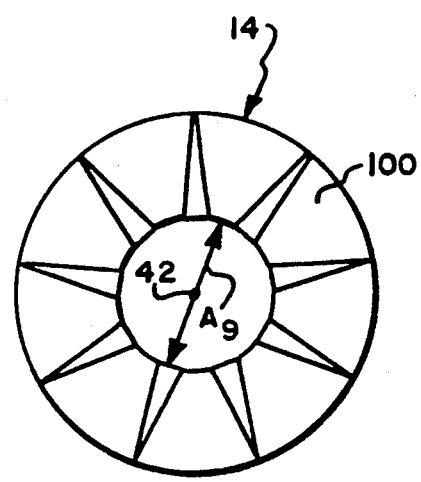
FIG. 24 is an upstream looking end view of the exhaust nozzle illustrated in FIG. 23.
Figure 23:
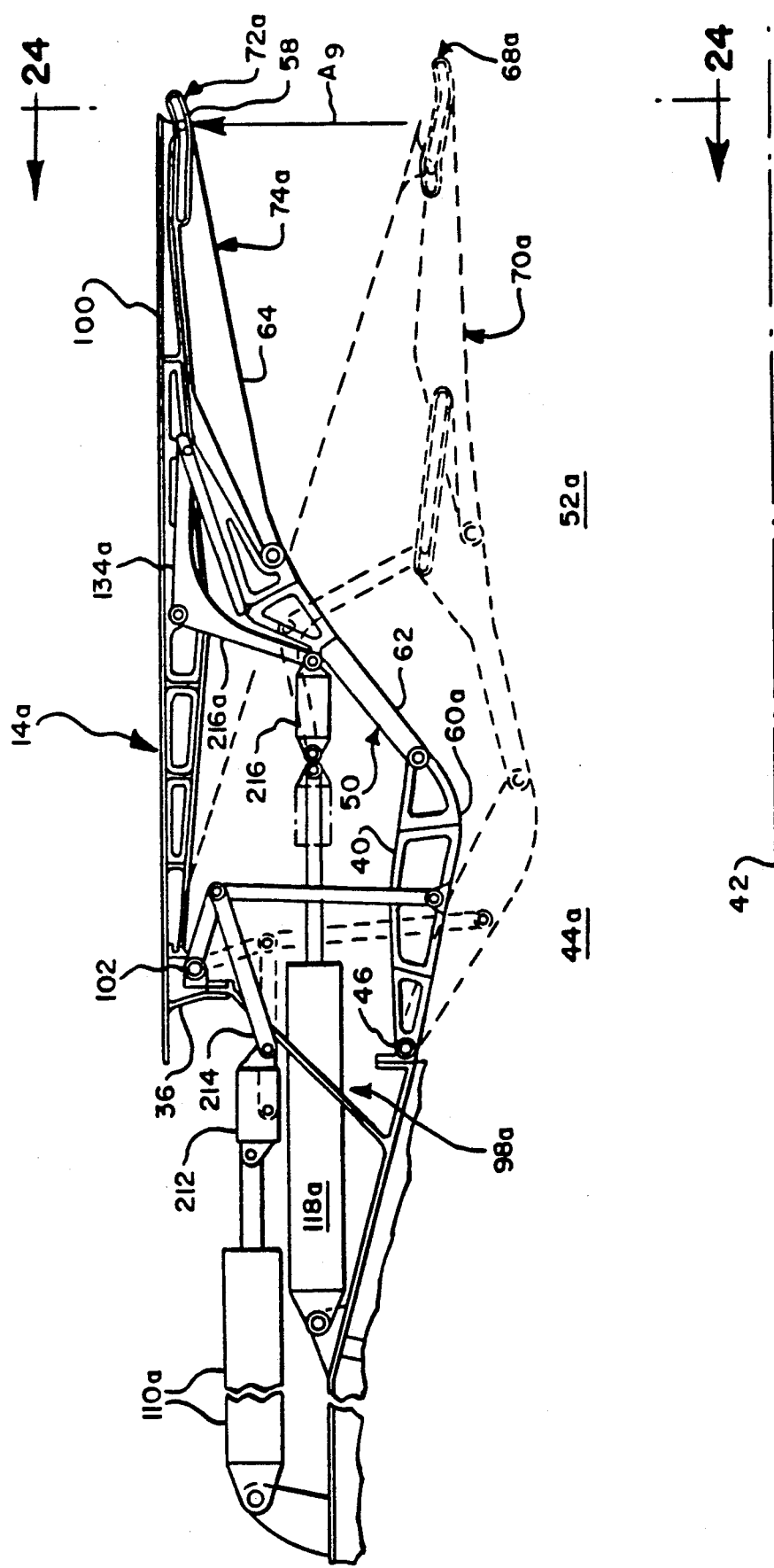
FIG. 23 is a side view, sectional representation of an axisymmetric exhaust nozzle in accordance with another embodiment of the invention illustrating the primary and secondary flaps in dashed line at a first position corresponding to low nozzle pressure ratio and in solid line at a second position corresponding to a high nozzle pressure ratio.

The method in accordance with the present invention may also be practiced on other types of exhaust nozzles including the conventionally known axisymmetric type, one embodiment of which is illustrated in FIGS. 23 and 24. In this embodiment, the primary and secondary flaps 40 and 50 are spaced circumferentially about the longitudinal centerline 42 of the exhaust nozzle 14, which is designated exhaust nozzle 14a. Each of the secondary flaps includes, in this exemplary embodiment, two flap segments, i.e., the forward flap segment 62 and the aft flap segment 64. Movement of the primary and secondary flaps 40 and 50 of the exhaust nozzle 14a is generally similar to that associated with the exhaust nozzle 14 illustrated in FIGS. 9 and 10. In FIG. 23, the primary and secondary flaps 40 and 50 are positinable at a first position 68a (shown in dashed line) for obtaining a first contour 70a which is substantially straight, but in this embodiment, is slightly inclined for obtaining a generally diverging exhaust channel 52a at the first, low value of NPR. The primary and secondary flaps 40 and 50 are positionable also at a second position 72a having maximum outlet area $A_9$ for maximum value of NPR and forms the second contour 74a which is generally concave. In this embodiment of the invention, the throat 60a is disposed upstream of the junction of the primary flap 40 and the secondary flap 50 and is formed by an intermediate portion of the primary flaps 40 to ensure that the throat 60a always effects a relatively minimum flow area $A_8$ during all positions of the flaps 40 and 50.

The positioning means 98a in this embodiment of the invention, includes a plurality of circumferentially spaced primary actuators 110a which translate a primary ring 212 which is conventionally joined to the primary flaps 40 and the casing 36 by conventional three-bar linkages 214. Translation of the primary ring 212 rotates the primary flaps 40 about their upstream ends 46 for varying the flow area $A_8$ at the throat 60a. A plurality of secondary actuators 118a are operatively connected to a secondary ring 216 which in turn is pivotally connected to a plurality of L-shaped bell cranks, or driven links, 134a which are pivotally joined to the outer flaps 100 and slidably joined to the forward flap segments 62 through a roller and slot cam arrangement. The secondary actuators 118a and the bell cranks 134a operate conventionally for rotating the outer flaps 100 about their upstream ends 102 for varying the flow area $A_9$ at the outlet 58 of exhaust nozzle 14a.

In all of the embodiments described above suitable, conventional means for sealing the articulated joints between respective flap segments may be provided. Furthermore, conventional means for cooling the primary and secondary flaps 40 and 50 may also be provided. In one embodiment, such cooling means may simply channel a portion of the bypass air flowing through the bypass duct 24 to outer surfaces of the primary and secondary flaps 40 and 50 for the cooling thereof.

While there have been described herein what are considered to be preferred embodiments of the present invention, other modifications of the invention shall be apparent to those skilled in the art from the teachings herein, and it is, therefore, desired to be secured in the appended claims all such modifications as fall within the true spirit and scope of the invention.

Accordingly what is desired to be secured by Letters Patent of the United States is the invention as defined and differentiated in the following claims.

I claim:

1. An exhaust nozzle for an engine effective for discharging combustion gases for generating thrust for powering an aircraft comprising:
 a casing having an inlet for receiving combustion gases from said engine;
 a plurality of primary flaps defining a generally converging channel in flow communication with said inlet, each of said primary flaps having an upstream end, pivotally joined to said casing, and a downstream end;

a plurality of secondary flaps extending downstream from said primary flaps and defining an exahaust channel for receiving said combustion gases from said converging channel and discharging said combustion gases from said nozzle for generating said thrust, each of said secondary flaps including an upstream end, pivotally joined to a respective primary flap downstream end, and a downstream end, said secondary flap downstream ends defining an outlet therebetween; and means for contouring said secondary flaps to a first contour at a first position for discharging said combustion gases through said exhaust channel at a first value of a nozzle pressure ration NPR defined across said converging and exhaust channels, and to a second contour at a second position for discharging said combustion gases through said exhaust channel at a second value of said NPR, said second contour, said second position, and said second NPR value being different than said first contour, said first position, and said first NPR value, respectively.

2. An exhaust nozzle according to claim 1 wherein:

said nozzle has a flow area $A_9$ at said outlet of said exhaust channel and a flow area $A_8$ at a throat defined at a junction of said primary and secondary flaps;

said first contour is substantially straight;

said first position of said secondary flaps provides a first $A_9/A_8$ ratio;

said second contour is generally concave toward said combustion gases in said exhaust channel;

said second position of said secondary flaps provides a second $A_9/A_8$ ratio being greater than said first $A_9/A_8$ ratio, said second $A_9/A_8$ ratio being a high $A_9/A_8$ ratio relative to said first $A_9/A_8$ ratio, said first $A_9/A_8$ ratio being a low $A_9/A_8$ ratio relative to said second $A_9/A_8$ ratio; and said second NPR value is greater than said first NPR value, said second NPR value being a high NPR value relative to said first NPR value, said first NPR value being a low NPR value relative to said second NPR value.

3. An exhaust nozzle according to claim 2 wherein said high NPR value is greater than about 30.

4. An exhaust nozzle according to claim 3 wherein said high NPR value is associated with a speed of said aircraft greater than about Mach 2.5.

5. An exhaust nozzle according to claim 1 wherein said second contour is generally concave for providing substantially isentropic expansion of said combustion gases channeled through said exhaust channel.

6. An exhaust nozzle according to claim 2 wherein said second contour is formed of at least two secondary flap segments joining each other at an obtuse angle to define said concave second contour.

7. An exhaust nozzle according to claim 6 wherein each of said segments includes a straight inner surface facing said combustion gases.

8. An exhaust nozzle according to claim 2 wherein said contouring means comprises:

eachg of said secondary flaps including a forward flap segment having said secondary flap upstream end, a downstream end, and an inner surface facing said combustion gases; and an aft flap segment having an upstream end pivotally joined to said forward flap segment downstream end to define an intermediate joint, and having said secondary flap downstream end, and an inner surface for facing said combustion gases: and means for positioning said primary and secondary flaps including:

a plurality of outer flaps surrounding said secondary flaps, each of said outer flaps including an upstream end pivotally connected to said casing, and a downstream end pivotally joined to a respective secondary flap downstream end; and linkage means pivotally joining each of said outer flaps to a respective forward flap segment for controlling position of said intermediate joint in response to position of said outer flap.

9. An exhaust nozzle according to claim 8 wherein said positioning means further includes:

a plurality of primary levers each fixedly joined to each of said primary flap upstream ends for rotation therewith;

a primary actuator joined to each primary lever for rotating said primary flaps about said primary flap upstream ends for varying said throat area $A_8$;

a plurality of secondary levers, each fixedly joined to each of said outer flap upstream ends for rotation therewith; and a secondary actuator joined to each of said secondary levers for rotating said outer flaps about said outer flap upstream ends for varying said outlet area $A_9$.

10. An exhaust nozzle according to claim 8 wherein said positioning means further includes an elongate aft cam slot fixedly joined to each of said secondary flap downstream ends, and an aft roller pivotally joined to said outer flap downstream end and slideably engaged in said aft cam slot for allowing said outer flap downstream end to pivot and slide relative to said secondary flap downstream end; and wherein said linkage means includes:

an elongate intermediate cam slot fixedly joined to each of said forward flap segment downstream ends;

a driven link having an upstream end pivotally connected to said casing, and a downstream end including an intermediate roller pivotally and slideably engaged in said intermediate cam slot; and a driver link pivotally joined to intermediate portions of said outer flap and said driven link; and said positioning means is effective for positioning said foward and aft flap segment inner surfaces colinearly in said first position for forming said first contour, and obliquely in said second position for forming said second contour, said aft and intermediate cam slots being effective for accommodating relative movement of said secondary flap, driven link and outer flap as they are positioned from said first position to said second position.

11. An exhaust nozzle according to claim 10 wherein said contouring means further includes:

said forward flap segment inner surface extending from said forward flap upstream end to a first intermediate portion of said forward flap segment;

said aft flap segment inner surface extending from said aft flap segment downstream end to a first intermediate portion of said aft flap segment;

each of said secondary flaps including a third flap segment having a downstream end pivotally and slideably joined to said aft flap segment first intermediate portion to define a first articulated joint, and an upstream end pivotally joined to said forward flap segment first intermediate portion to define a second articulated joint, and an inner surface extending therebetween so that said third flap segment is positioned in response to relative angular position of said aft and forward flap segments to form said second contour including said forward, third, and aft flap segment inner surfaces disposed adjacent to each other at said first and second articulated joints to define said generally concave second contour.

12. An exhaust nozzle according to claim 11 further including a logitudinal centerline axis and wherein each of said forward, third, and aft flap segment inner surfaces is straight and inclined relative to said longitudinal centerline axis at acute angles $60_1$, $\alpha_2$, and $\alpha_3$, respectively, when said secondary flap is positioned at said second position.

13. An exhaust nozzle according to claim 12 wherein said secondary flap segments are positioned at said second position so that $\alpha_2 - \alpha_1$ equals $\alpha_3 - \alpha_2$.

14. An exhaust nozzle according to claim 12 wherein said three secondary flap segment inner surfaces are of equal length.

15. An exhaust nozzle according to claim 11 wherein said contouring means further includes:
  each of said secondary flaps including a fourth flap segment pivotally joining said third flap segment to said forward flap segment and having a dopwnstream end pivotally joined to said third flap segment to define said second articulated joint, and an upstream end pivotally joined to said forward flap segment first intermediate portion to define a third articulated joint, and an inner surface extending therebetween;
  an elongate first positioning bar disposed radially outwardly of said third and fourth flap segments and having an upstream end pivotally connected to said forward flap segment at a second intermediate portion thereof and a downstream end pivotally and slideably connected to said aft flap segment at a second intermediate portion thereof;
  a first positioning link pivotally joining said first positioning bar to said second articulated joint; and
  wherein said first and third articulated joints are directly positioned with said aft and forward flap segments, respectively, and said second articulated joint is positioned by said first positioning bar and link in response to relative angular position of said aft and forward flap segments to form said second contour from said forward, aft, third and fourth flap inner surfaces.

16. An exhaust nozzle according to claim 15 wherein said forward, aft, third and fourth flap segment inner surfaces are each straight and of equal length.

17. An exhaust nozzle according to claim 15 wherein said contouring means further includes:
  each of said secondary flaps including a fifth flap segment pivotally joining said fourth flap segment to said forward flap segment and having a downstream end pivotally connected to said fourth flap segment upstream end to define said third articulated joint, and an upstream end pivotally connected to said forward flap segment first intermediate portion to define a fourth articulated joint, and an inner surface extending therebetween;
  said first positioning bar being disposed radially outwardly of said third, fourth, and fifth flap segments;
  a second positioning link pivotally joining said first positioning bar to said third articulated joint; and
  wherein said second and third articulated joints are positioned by said first positioning bar and said first and second positioning links, respectively, in response to relative angular position of said aft and forward flap segments to form said second contour from said forward, aft, third, fourth, and fifth flap segment inner surfaces.

18. An exhaust nozzle according to claim 17 wherein said forward, aft, third, fourth, and fifth flap segment inner surfaces are each straight and of equal length.

19. An exhaust nozzle according to claim 17 wherein said contouring means further includes:
  each of said secondary flaps including a sixth flap segment pivotally joining said fifth flap segment to said forward flap segment and having a downstream end pivotally conected to said fifth flap segment upstream end to define said fourth articulated joint, and an upstream end pivotally connected to said forward flap segment first intermediate portion to define a fifth articulated joint, and an inner surface extending therebetween;
  said first positioning bar being disposed radially outwardly of said third, fourth, fifth and sixth flap segments;
  an elongate second positioning bar disposed radially outwardly of said third and fourth flap segments and radially inwardly of said first positioning bar, and having an upstream end pivotally connected to an intermediate portion of said first positioning bar and a downstream end pivotally and slideably connected to a third intermediate portion of said aft flap segment disposed between said first and second intermediate portions of said aft flap segment;
  said first positioning link joining said second articulated joint to said second positioning bar for joining said second articulated joint to said first positioning bar;
  a third positioning link pivotally joining said first positioning bar to said fourth articulated joint; and
  wherein said second, third and fourth articulated joints are positioned by said first and second positioning bars in response to relative angular position of said aft and forward flap segments to form said second contour from said forward, aft, third, fourth, fifth and sixth flap segment inner surfaces.

20. An exhaust nozzle according to claim 19 wherein said forward, aft, third, fourth, fifth and sixth flap segment inner surfaces are each straight and of equal length.

21. An exhaust nozzle according to claim 19 wherein said forward, third, fourth, fifth and sixth flap segments are integral and are flexible at said second, third and fourth articulated joints and at said sixth flap segment upstream end.

22. An exhaust nozzle according to claim 10 wherein said exhaust nozzle is axisymmetric about a longitudinal centerline axis of said exhaust nozzle and said primary and secondary flaps are circumferentially spaced about said longitudinal centerline axis.

23. An exhaust nozzle according to claim 10 wherein said exhaust nozzle is a 2D nozzle defining a generally rectangular throat area $A_8$ and outlet area $A_9$, and respective ones of said primary flaps and secondary flaps are disposed on opposite sides of said longitudinal centerline axis to define said converging and exhaust channels.

* * * * *